United States Patent [19]

Usui et al.

[11] Patent Number: 5,235,399
[45] Date of Patent: Aug. 10, 1993

US005235399A

[54] TEMPERATURE MEASURING APPARATUS UTILIZING RADIATION

[75] Inventors: Tatehito Usui; Tomoji Watanabe, both of Ibaraki; Junichi Kobayashi, Ushiku; Takehiko Ooshima, Ibaraki; Shunji Sasabe, Iruma, all of Japan

[73] Assignee: Hitachi, Ltd., Tokyo, Japan

[21] Appl. No.: 719,945

[22] Filed: Jun. 24, 1991

[30] Foreign Application Priority Data

Sep. 6, 1990 [JP] Japan ................... 2-236712

[51] Int. Cl.$^5$ .................... G01J 5/06; G01J 5/08; G01J 5/10
[52] U.S. Cl. ......................... 356/45; 356/43; 356/418; 374/121; 374/130; 118/715; 204/298.01
[58] Field of Search ............ 356/43, 44, 45, 46, 356/48, 49, 50, 51, 418, 314; 250/214, 227.11; 374/121, 130, 131; 118/712, 666, 715, 723; 427/10; 204/298.01, 298.07, 298.09, 298.32

[56] References Cited
U.S. PATENT DOCUMENTS 4,859,277 8/1989 Barna et al. .................. 118/712

Primary Examiner—Vincent P. McGraw
Assistant Examiner—La Charles Keesee
Attorney, Agent, or Firm—Antonelli, Terry, Stout & Kraus

[57] ABSTRACT

An apparatus for measuring the temperature of an object placed in a plasma by utilizing radiation includes measuring means for measuring the intensity of radiation from the object and the intensity of plasma light in different directions at the same time. The measuring means includes a first lens for receiving the radiation from the object and the plasma light, a second lens for converting the output beam of the first lens into parallel light rays, a third lens for focusing the parallel light rays, and an interference filter disposed rotatably between the second lens and the third lens.

16 Claims, 8 Drawing Sheets

TO PERSONAL COMPUTER

TEMPERATURE MEASURING APPARATUS UTILIZING RADIATION

BACKGROUND OF THE INVENTION

The present invention relates to a radiation thermometer for detecting the thermal radiation of an object placed in a plasma to determine the temperature of the object, a sputtering apparatus using the radiation thermometer for manufacturing semiconductor devices, and a method of measuring the temperature of an object by using radiation.

Various kinds of radiation thermometers have been known which include a monochromatic radiation thermometer for determining the temperature of an object to be measured by measuring the intensity of radiation emitted from the to-be-measured object (that is, energy emitted from the object), and a two-wavelength radiation thermometer for determining the temperature of an object to be measured from a ratio of the intensity of one of two wavelength components of radiation to the intensity of the other wavelength component.

Technology relating to radiation thermometers of this kind is disclosed in a Japanese patent application Post-Exam. Publn. No. Sho 60-58411 (JP-B-60-58411) and a Japanese patent application Post-Exam. Publn. No. Sho 60-58412 (JP-B-60-58412).

According to the prior art, in a case where a radiator such as a plasma is present in the vicinity of an object to be measured, the intensity of plasma light is added to the intensity of thermal radiation emitted from the to-be-measured object, and thus it is difficult to determine the correct temperature of the to-be-measured object.

Further, since the correct temperature cannot be determined, it is impossible to exactly measure the temperature distribution on the surface of an object to be measured. In a plasma processing apparatus, it is very important for the fabrication of semiconductor devices to exactly measure the temperature distribution on the surface of a wafer to be measured.

SUMMARY OF THE INVENTION

It is an object of the present invention to provide a radiation thermometer capable of determining the correct temperature of a body placed in a plasma without being affected by the plasma.

It is another object of the present invention to provide a method of measuring the temperature of a body placed in a plasma by using radiation.

It is a further object of the present invention to provide a sputtering apparatus which uses the above radiation thermometer.

According to an aspect of the present invention, there is provided a temperature measuring apparatus utilizing radiation which apparatus comprises: measuring means for measuring the intensity of radiation from a to-be-measured object placed in a plasma and the intensity of plasma light in different directions at the same time; means for correcting the measured value of intensity of the radiation by the measured value of intensity of the plasma light to determine the intensity of thermal radiation of the to-be-measured object on the basis of the measured values being obtained by the measuring means; and means for calculating the temperature of the to-be-measured object from the intensity of thermal radiation thus determined.

Further, according to another aspect of the present invention, there is provided an imaging spectral analyzer usable as a temperature measuring apparatus for determining the spatial distribution of the light intensity on a radiator placed in a plasma which analyzer comprises: a first lens for receiving radiation from the radiation emitter and plasma light; a second lens for converting the output beam of the first lens into parallel light rays; a third lens for focusing the parallel light rays; and an interference filter disposed rotatably between the second lens and the third lens.

DESCRIPTION OF THE PREFERRED EMBODIMENTS

The present invention will be explained below in detail on the basis of embodiments thereof.

Figure 1:
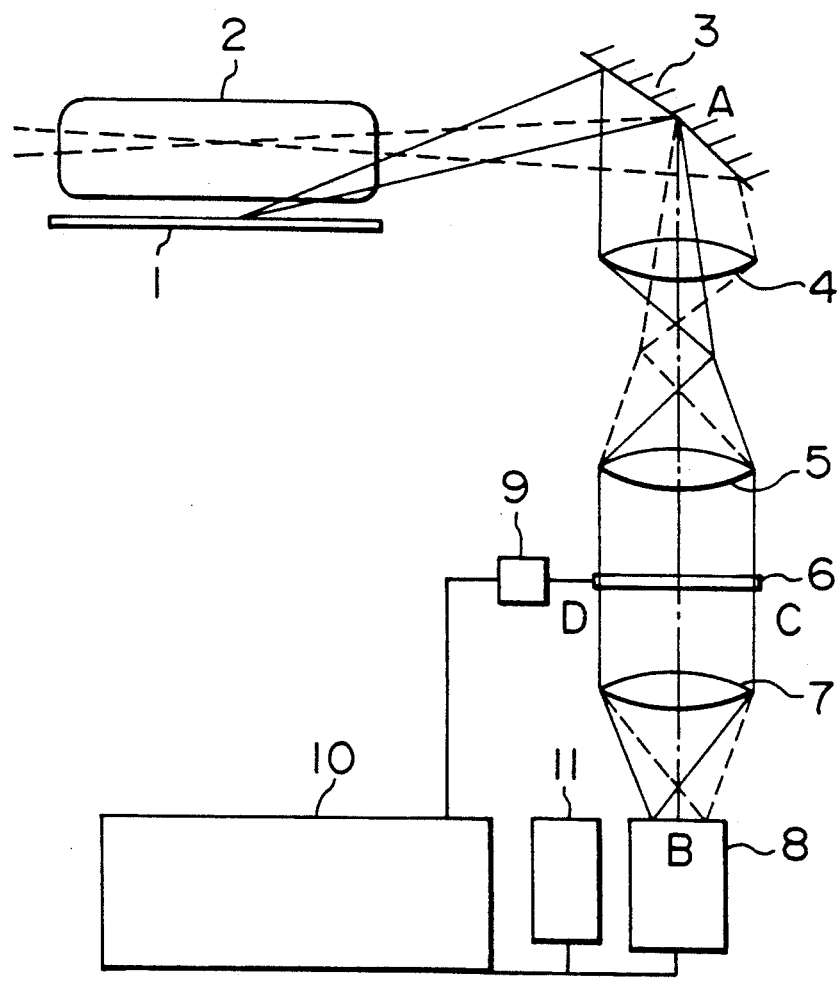
FIG. 1 is a schematic diagram showing the whole construction of a radiation thermometer which is the first embodiment of the present invention.

FIG. 1 shows the whole construction of a radiation thermometer which is the first embodiment of the present invention. As shown in FIG. 1, the radiation thermometer includes a multi-surface mirror 3 for receiving radiation from an object 1 to be measured and plasma light from a plasma 2 in different directions at the same time to reflect the radiation and plasma light in the same direction, a camera lens 4 for condensing each of the radiation and plasma light reflected from the mirror 3, a first relay lens 5 for converting the output beam of the camera lens 4 into parallel light rays, an interference filter 6 for transmitting a specified wavelength component of the parallel light rays, a second relay lens 7 for focusing a light beam having passed through the interference filter 6, and an imaging element 8 for converting an image formed of the focused light beam into a video signal. The interference filter 6 is coupled with a stepping motor 9. When the stepping motor 9 is driven on the basis of a command from a personal computer 10, the interference filter 6 turns on an axis C-D perpendicular to an optical axis A-B. The video signal from the imaging element 8 is supplied to a recording device 11 or the personal computer 10 to be processed.

The intensity distribution of plasma light from the plasma 2 and the intensity distribution of the sum of radiation from the to-be-measured object 1 and plasma light from the plasma 2 appear on the surface of the imaging element 8. In a case where the intensity of plasma light is uniform, the intensity of thermal radiation of the to-be-measured object 1 can be determined on the basis of the intensity distribution of plasma light and the geometrical arrangement of the to-be-measured object 1 by using the arithmetic unit of the personal computer 10. In a case where the intensity of plasma light is not uniform, the intensity of thermal radiation of the to-be-measured object 1 can be determined by taking the spatial distribution of plasma light into consideration on the basis of mathematical processing such as an Abel transformation.

As mentioned above, the intensity of thermal radiation of the to-be-measured object 1 can be determined without being affected by the plasma light from the plasma 2. Thus, the correct temperature of the to-be-measured object 1 can be determined.

Figure 2:
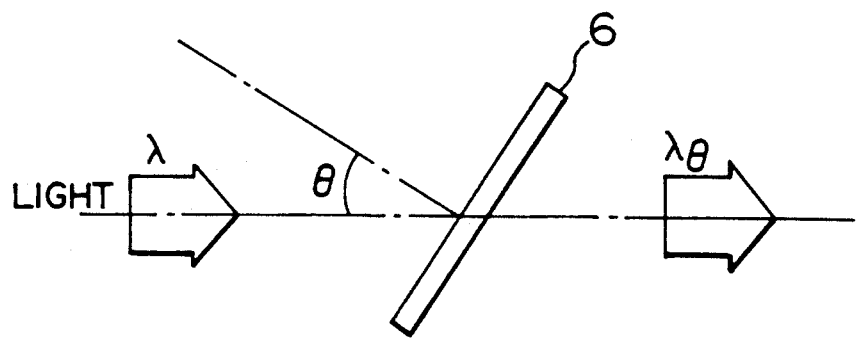
FIG. 2 is a schematic diagram for explaining the principle of the interference filter.

Next, explanation will be made of a case where the embodiment of FIG. 1 is used as a multi-wavelength radiation thermometer. FIG. 2 is a graph for explaining the principle of the interference filter 6. In more detail, when the wavelength of light which has an incident angle of 0° and can pass through the interference filter, and the wavelength of light which has an incident angle of $\theta$ and can pass through the interference filter are expressed by $\lambda_0$ and $\lambda_\theta$, respectively, the transmission characteristic of the interference filter is given by the following equation:

$$\lambda_\theta = \lambda_0 \sqrt{1 - A \sin^2\theta}$$

That is, when the angle of incidence for the interference filter 6 is changed, the wavelength of light passing through the interference filter 6 is varied. The symbol A in the above equation indicates a constant of the interference filter 6 which constant depends upon the refractive index and thickness of an interference film formed on the filter 6.

Figure 3:
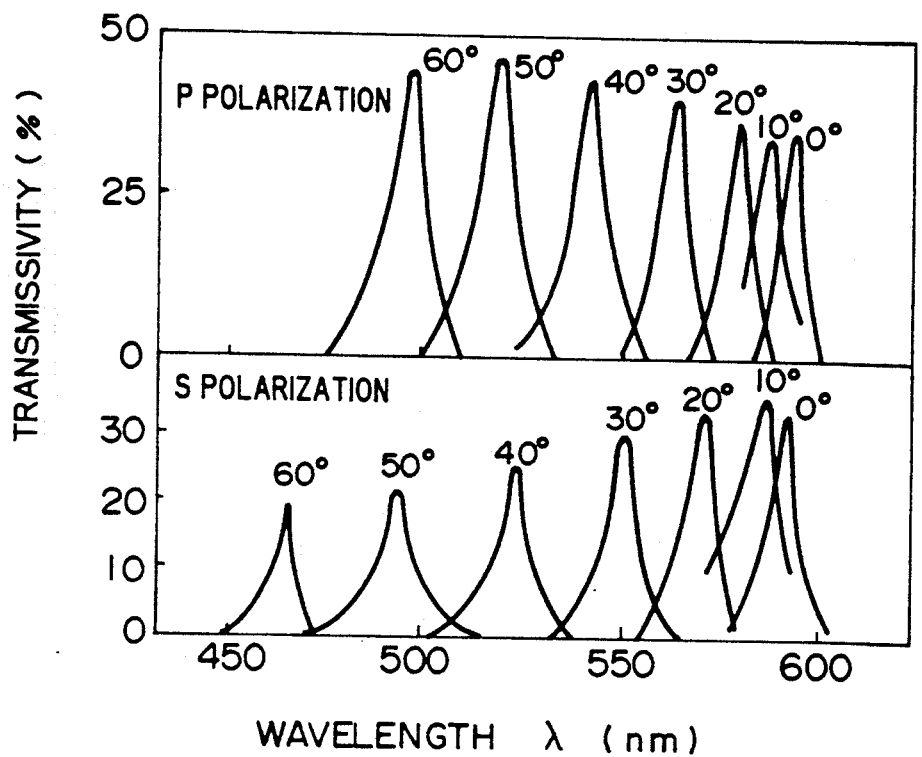
FIG. 3 is a graph showing the characteristic of an interference filter used in the present invention.

FIG. 3 shows an example of the dependence of the transmitted wavelength of an interference filter on the angle of incidence.

In FIG. 3, the numbers on the abscissa indicate the transmitted wavelength $\lambda$ and the numbers on the ordinate indicate the percent transmissivity of the filter. In more detail, FIG. 3 shows how the transmitted wavelength of each of P-polarized light and S-polarized light is changed when the angle of incidence is varied at an interval of 10° in a range from 0° to 60°. The term "P-polarized light" indicates a polarized component whose electric vector is parallel to the plane of incidence of the interference filter (that is, a plane defined by an optical axis and a normal to the interference filter), and the term "S-polarized light" indicates a polarized component perpendicular to the P-polarized light.

As shown in FIG. 3, when the angle of incidence is set to 0°, the transmitted wavelength of each of the P-polarized light and the S-polarized light is about 590 nm. When the angle of incidence is increased to 60°, the transmitted wavelength of the P-polarized light is about 490 nm. That is, when the angle of incidence is changed from 0° to 60°, the transmitted wavelength of the P-polarized light decreases by about 100 nm. On the other hand, the transmitted wavelength of the S-polarized light is about 460 nm at a time when the angle of incidence is set to 60°. That is, when the angle of incidence is changed from 0° to 60°, the transmitted wavelength of the S-polarized light decreases by about 130 nm.

Accordingly, when the interference filter 6 is rotated so that the angle of incidence for the interference filter 6 is changed from 0° to 45°, by driving the stepping motor 9 under the control of the personal computer 10, the measured wavelength can be changed by about 100 nm. Thus, the embodiment of FIG. 1 can be used as a multi-wavelength radiation thermometer which is excellent in measuring accuracy.

In this case, an appropriate measured wavelength can be previously determined or selected on the basis of a plasma light data base stored in the personal computer 10. Thus, the adverse effect of the plasma 2 can be appropriately removed. As regards plasma light data, refer to a publication entitled "Tables of Spectral Lines of Neural and Ionized Atoms" by A. R. Striganov and N. S. Sventitskii (Kurchatov Institute), IFI/Pleum (1968), and a publication entitled "The Identification of Molecular Spectra" by R. W. B. Pearse and A. G. Gaydon (Imperial College London), Chapman & Hall Ltd. (1978).

Figure 4:
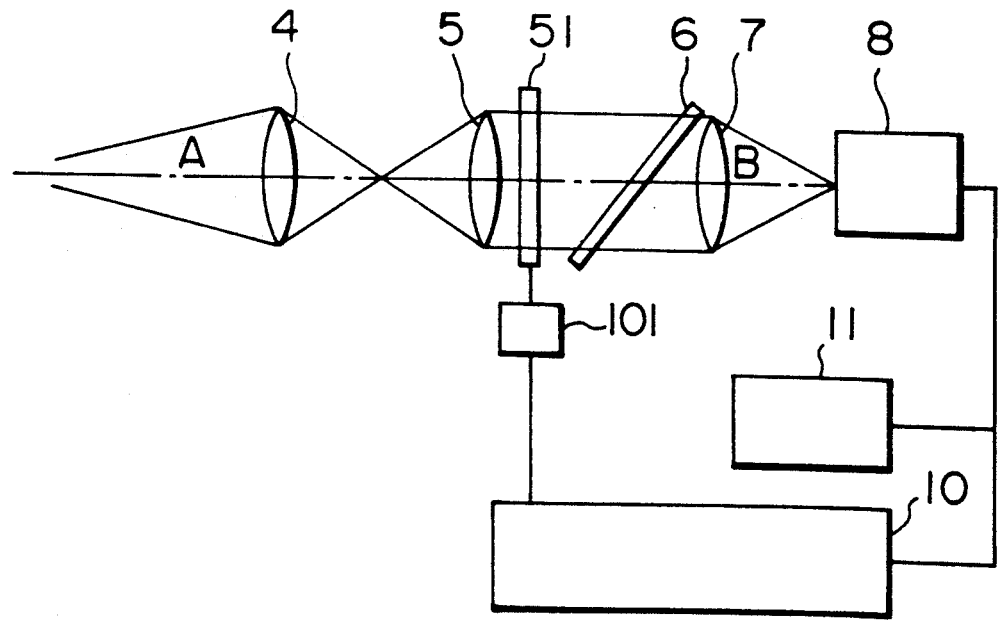
FIG. 4 is a schematic diagram showing an imaging spectral analyzer which is the second embodiment of the present invention.

FIG. 4 shows the second embodiment of the present invention. In the following explanation, the same reference numerals as used in FIG. 1 designate like parts or devices.

In the second embodiment of FIG. 4, the angle of incidence for the interference filter 6 is set to about 40°, and a polarization filter 51 is disposed in front of the interference filter 6. The polarization filter 51 can be rotated round an optical axis A-B through an angle of 90° by a polarization filter driving device 101. Thus, the measured wavelength can be selected from two values by utilizing the difference in transmitted wavelength between the P-polarized light and the S-polarized light shown in FIG. 3.

In the second embodiment, the transmitted wavelength of the interference filter can be changed by about 25 nm, by rotating the polarization filter.

In the second embodiment, the polarization filter is disposed in front of the interference filter. The polarization filter, however, may be disposed behind the interference filter, or in front of the camera lens.

Figure 5:
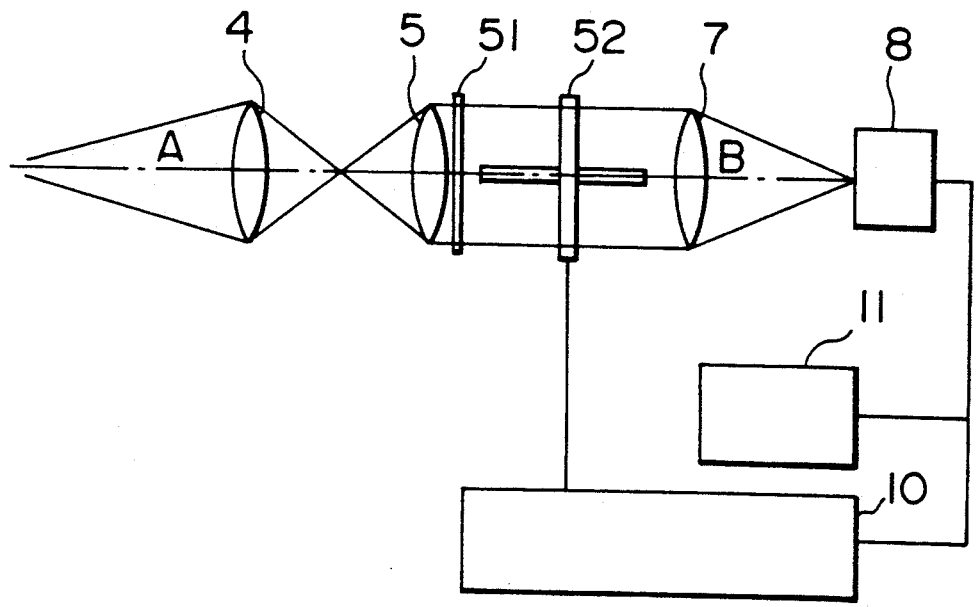
FIG. 5 is a schematic diagram showing another imaging spectral analyzer which is the third embodiment of the present invention.
Figure 6:
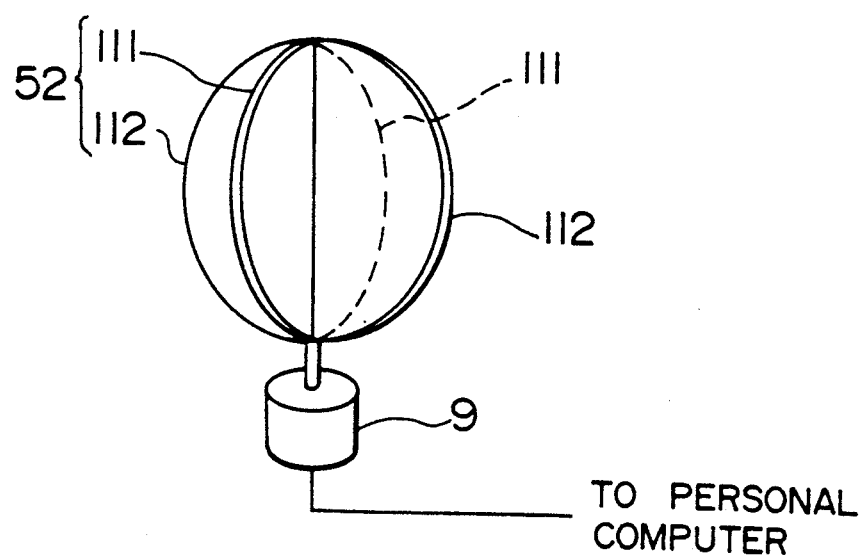
FIG. 6 is a schematic diagram showing a special interference filter included in the imaging spectral analyzer of FIG. 5.

FIG. 5 shows the third embodiment of the present invention viewed in directions parallel to the axis of rotation of an interference filter 52. FIG. 6 shows the interference filter 52 of FIG. 5 three-dimensionally. As shown in FIG. 6, the interference filter 52 includes two interference filter plates 111 and 112 having different transmitted wavelengths, and the interference filter plates 111 and 112 are combined so as to be perpendicular to each other. Further, the side face of each of the interference filter plates 111 and 112 is coated with black paint, to prevent light from passing through the side face. In a case where two wavelengths are to be measured, two interference filter plates capable of transmitting one and the other of the above wavelengths are combined to form the interference filter 52, and either one of the interference filter plates is caused to face the relay lens 7 by turning the rotor of the stepping motor 9 through an angle of 90°. Thus, the measured wavelength can be changed.

The present invention is not limited to the above embodiments. For example, an interference filter 300 shown in FIG. 7 may be used in the present invention. That is, the interference filter is divided into three parts, each of which is coated with an interference film capable of transmitting a desired measured wave-length. FIG. 8 shows an example of the emission spectrum of a radiation emitter which example is measured by using the interference filter of FIG. 7.

Figure 7:
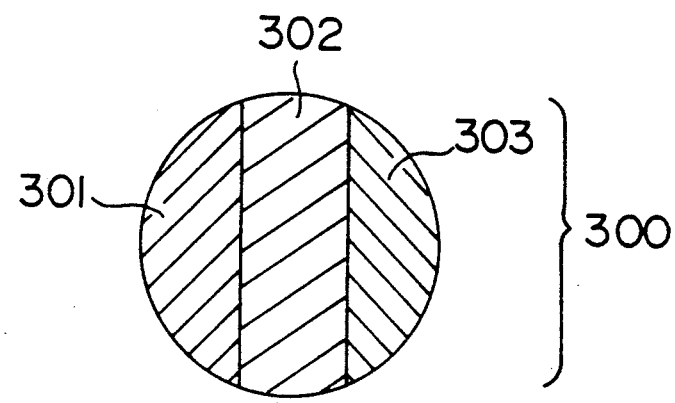
FIG. 7 is a schematic diagram showing another special interference filter.
Figure 8:
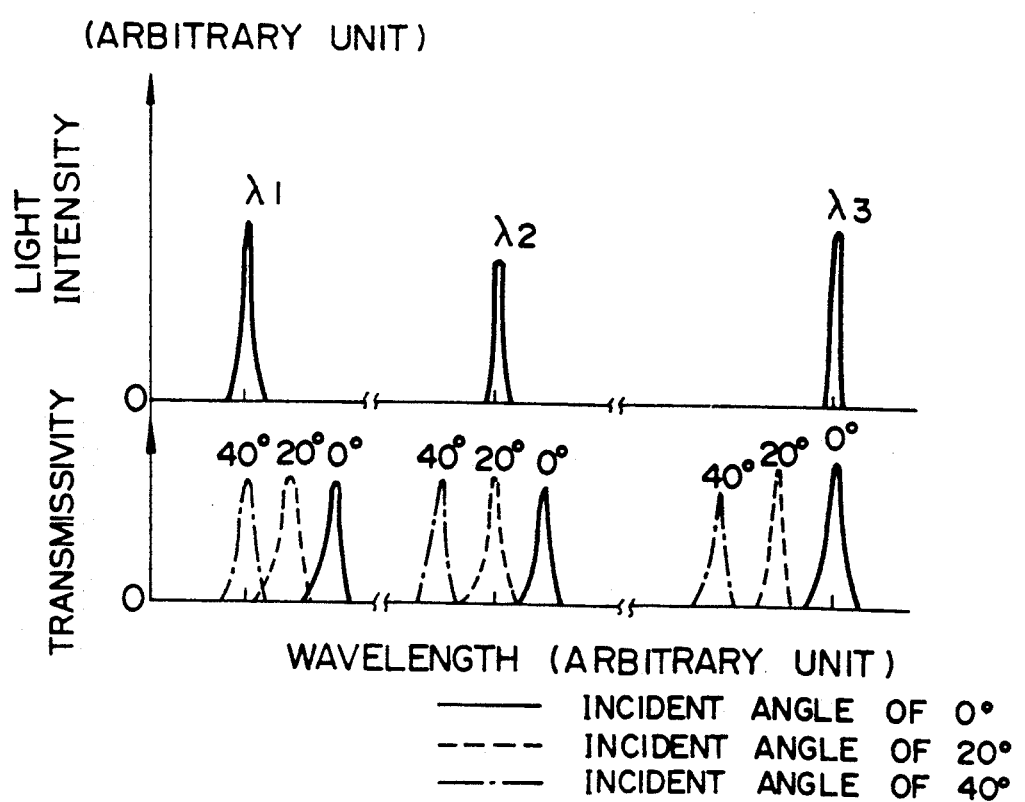
FIG. 8 is a graph showing light transmission characteristics of the special interference filter of FIG. 7.

The light transmission characteristic of each of interference films 301, 302 and 303 shown in FIG. 7 is as follows. When the angle of incidence is set to 40°, the interference film 301 transmits a wavelength component $\lambda_1$. When the angle of incidence is set to 20°, the interference film 302 transmits a wavelength component $\lambda_2$. When the angle of incidence is set to 0°, the interference film 303 transmits a wavelength component $\lambda_3$. That is, when the interference filter 300 is tilted so that the angle of incidence is 40°, an image due to the wavelength component $\lambda_1$ is detected by the imaging element. When the interference filter 300 is tilted so that the angle of incidence is 20°, an image due to the wavelength component $\lambda_2$ is detected by the imaging element. When the interference filter 300 is disposed so that the angle of incidence is 0°, an image due to the wavelength component $\lambda_3$ is detected by the imaging element.

In the above case, the polarization filter is mounted on the lens system. Alternatively, the polarization filter may be bonded to the interference filter or the imaging element (for example, a CCD or a vidicon).

Figure 9:
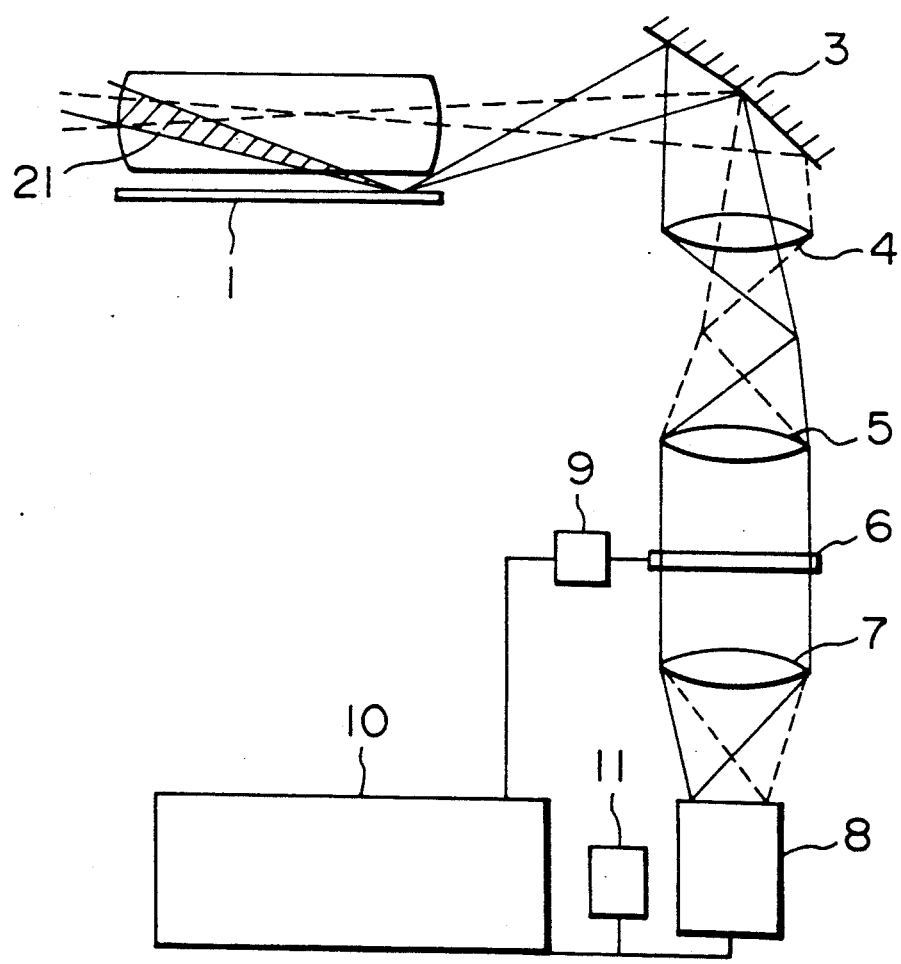
FIG. 9 is a schematic diagram showing the fourth embodiment of the present invention.

FIG. 9 shows the fourth embodiment of the present invention. In the present embodiment, the interference filter 6 is rotated by driving the stepping motor 9 under the control of the personal computer 10 so that plasma light passing through the interference filter 6 has a maximum intensity, that is, the most intense wavelength component of the plasma light passes through the filter 6. At this time, the intensity of reflection on the to-be-measured object 1 is measured by utilizing light from a part 21 of the plasma 2, to determine the reflectivity of the surface of the to-be-measured object 1. In this case, it is necessary to determine the light intensity distribution in the plasma 2 as in the first embodiment. When the reflectivity of the to-be-measured object 1 is determined in the above manner, it is possible to determine the temperature of a body whose reflectivity varies in a great degree.

Figure 10:
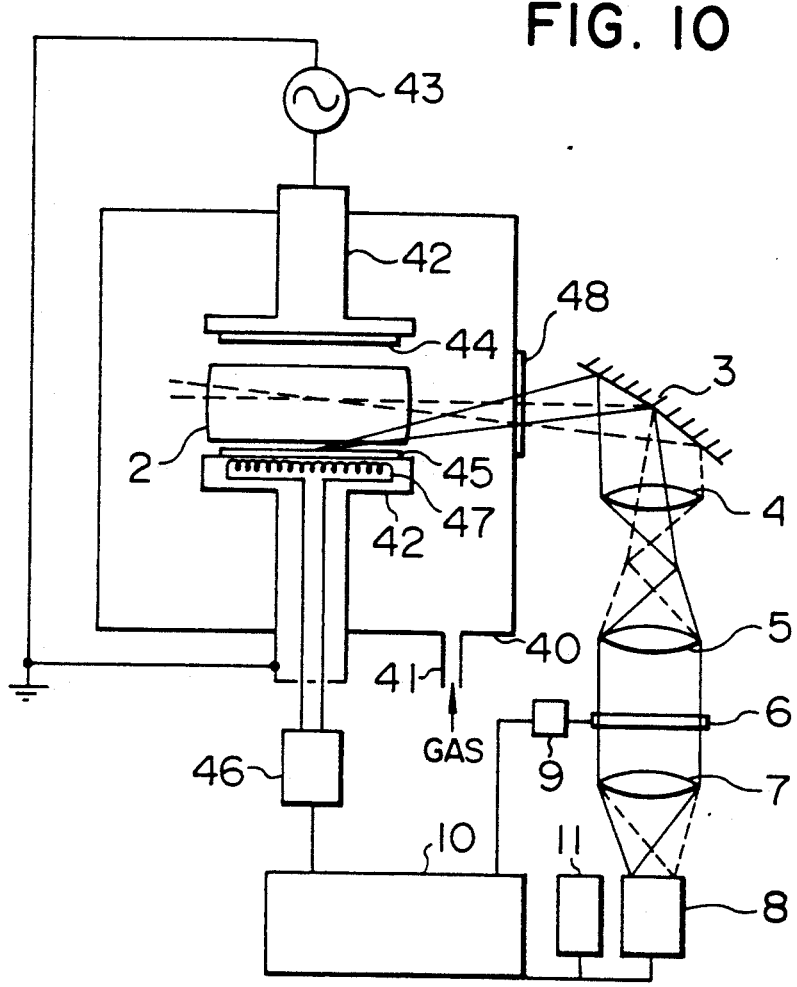
FIG. 10 is a schematic diagram showing the whole construction of an aluminum sputtering apparatus for manufacturing semiconductor devices which apparatus is the fifth embodiment of the present invention.

FIG. 10 shows an aluminum sputtering apparatus for manufacturing semiconductor devices which apparatus is the fifth embodiment of the present invention. Referring to FIG. 10, an argon gas for plasma discharge is supplied into a vacuum vessel 40 through a gas inlet 41 so that the argon pressure in the vessel 40 is kept at several mTorr. When a high-frequency voltage which is produced by a power source 43 and has a frequency of 13.56 MHz, is applied between a pair of parallel plate electrodes 42, the plasma 2 is generated between the electrodes 42. An aluminum target 44 is attached to one of the electrodes 42, and an object to be processed (for example, a semiconductor wafer 45) is attached to the other electrode. The wafer 45 is heated to a temperature of about 200° to 400° C. by a heater 47 which is connected to a power source 46.

Figure 11:
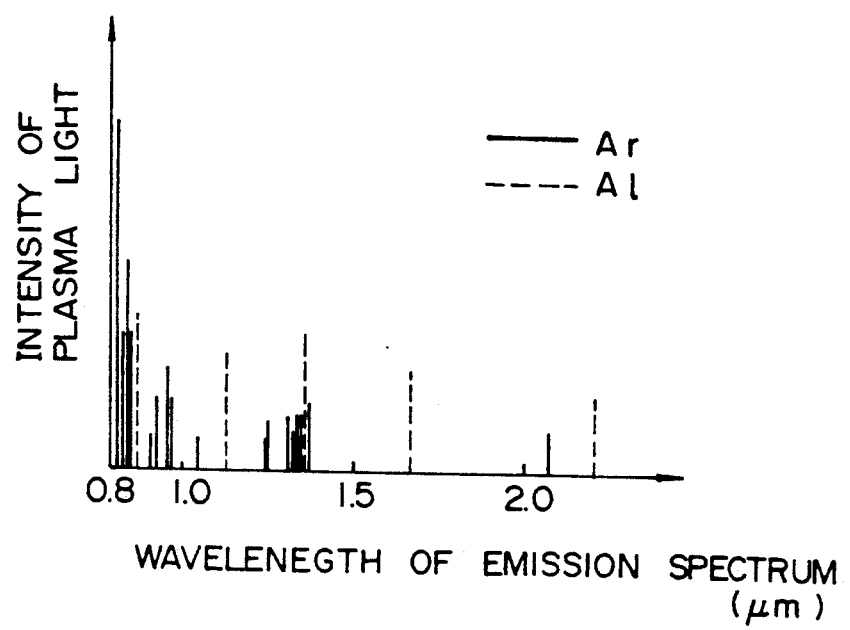
FIG. 11 is a graph showing a spectrum of plasma light.
Figure 12:
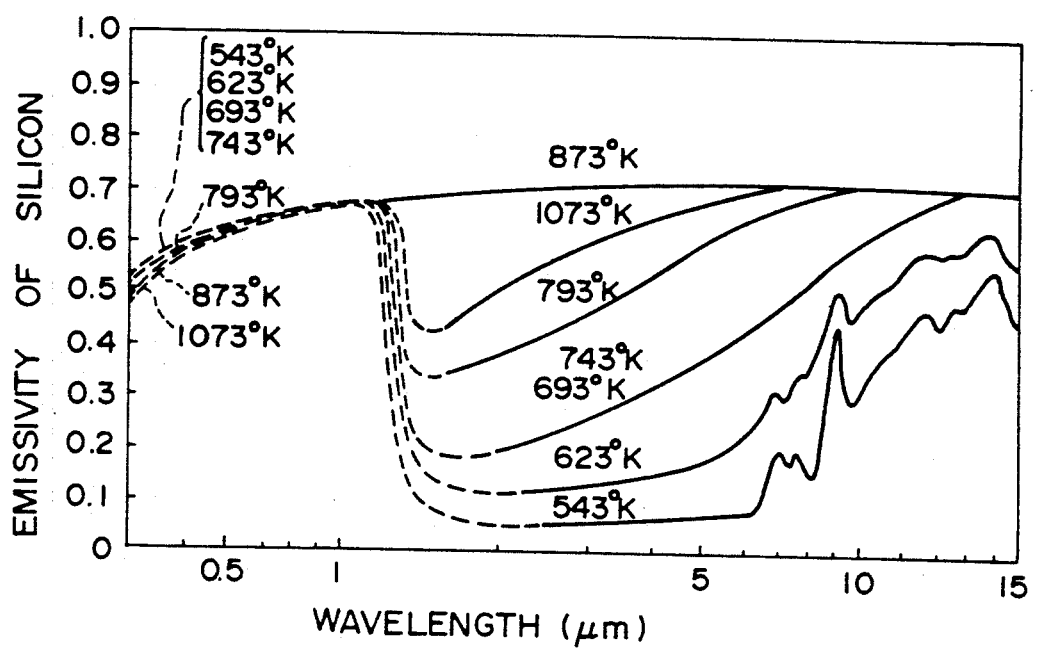
FIG. 12 is a graph showing how the emissivity of silicon depends upon the temperature thereof and a wavelength.

In the present embodiment, radiation from the semiconductor wafer 45 and plasma light from the plasma 2 are led to the above-mentioned radiation thermometer through a quartz window 48 mounted on the vacuum vessel 40. In the radiation thermometer, an emission spectrum from a region of the plasma 2 is measured by tilting the interference filter 6. FIG. 11 shows an example of the measured emission spectrum. In this example, not only spectral lines of argon (that is, solid lines) but also spectral lines of aluminum (that is, broken lines) are observed. In the present embodiment, a wavelength of 1.0 $\mu$m is used as the measured wavelength. As shown in FIG. 12 which is described on page 341 of an article entitled "Spectral Emissivity of Silicon" by T. Sato (J.I. Appl. Phys. Vol. 6, 1967), the temperature dependence of emissivity of silicon is very little at a wavelength of 1.0 $\mu$m. The radiation distribution on the silicon wafer 45 and the light distribution in the plasma 2 are measured to determine the temperature distribution on the silicon wafer 45. In this case, during a period when plasma processing is carried out, the power source 46 is controlled by the personal computer 10 so that the silicon wafer 45 is kept at a set temperature.

Figure 13:
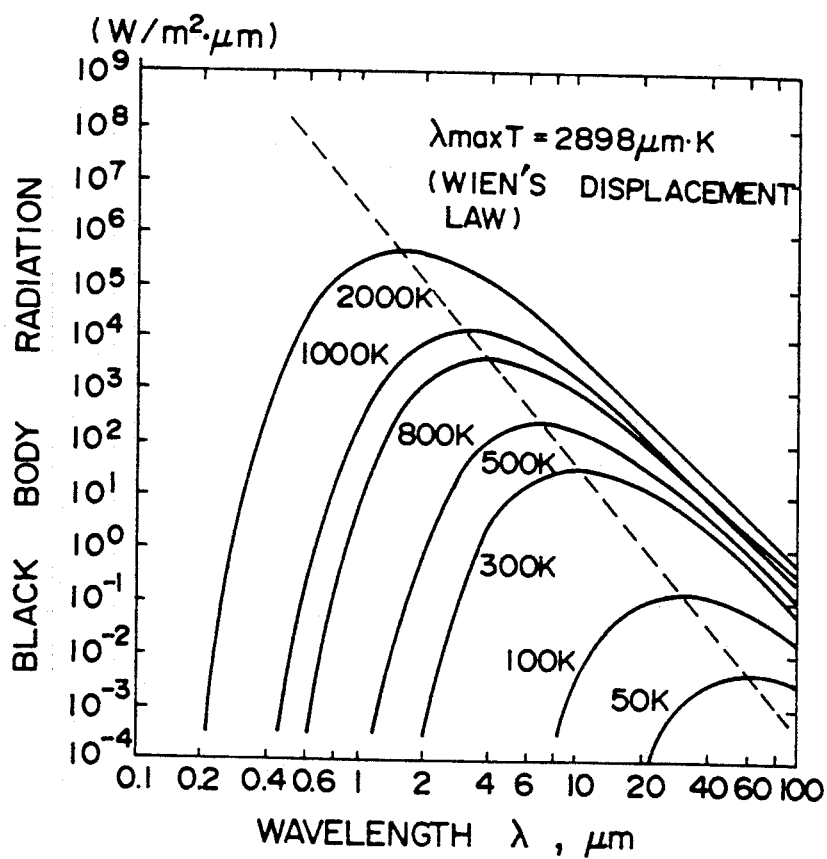
FIG. 13 is a graph showing the temperature dependence of black body radiation.

Further, in a case where the temperature of the silicon wafer is low, as can be predicted from the black body radiation shown in FIG. 13, radiation from a to-be-measured body (that is, the silicon wafer) is shifted to the long-wavelength side. Thus, each of a wavelength of 1.67 $\mu$m and a wavelength of 1.6 $\mu$m is used as the measured wavelength. It is to be noted that the temperature dependence of emissivity of silicon at a wavelength of 1.6 $\mu$m is large, as shown in FIG. 12. The reflectivity of the silicon wafer is determined by using a spectral line of aluminum having a wavelength of 1.67 $\mu$m. Then, the temperature distribution on the silicon wafer is determined by measuring the wave-length component of 1.6 $\mu$m and by using the reflectivity thus obtained.

Figure 14:
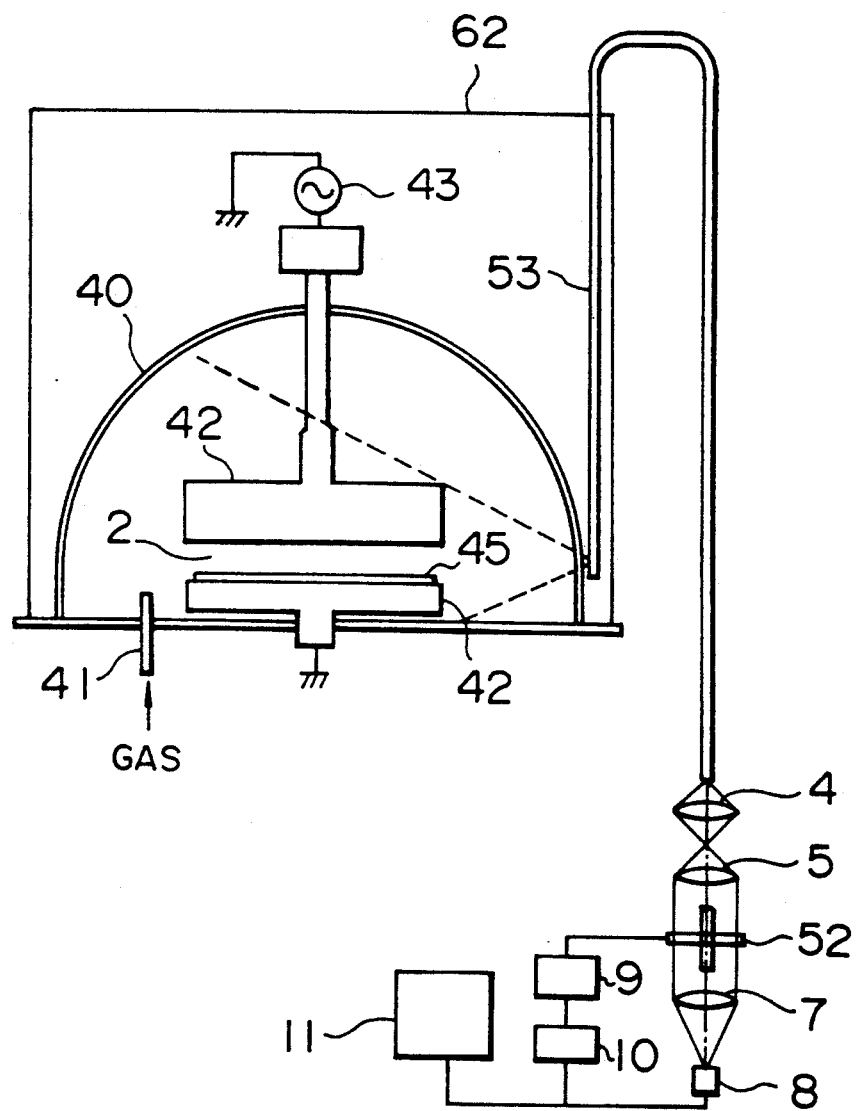
FIG. 14 is a schematic diagram showing a plasma processing apparatus according to the present invention for manufacturing semiconductor devices.

FIG. 14 shows a plasma generating apparatus. Referring to FIG. 14, a plasma generating region 2 is set in the vacuum vessel 40 made of quartz. A mixing gas of $CF_4$ and $O_2$ which serves as a reactant gas is supplied to the plasma generating region 2 through the gas inlet 41 so that the pressure of the reactant gas is kept at several Torr. When a high-frequency voltage which is produced by the power supply 43 and has a frequency of 13.56 MHz is applied between the parallel plate electrodes 42, a plasma is generated between the electrodes 42. An object to be processed (for example, a semiconductor wafer 45) is disposed in the plasma generating region 2 in such a manner that the wafer is placed on one of the electrodes 42. The whole of the plasma generating apparatus is protected by a cover 62.

In the above plasma generating apparatus, light from the plasma is led to a spectral surface analyzer according to the present invention through an aperture formed in the cover 62 and having a hole of a diameter of 10 mm, and an optical fiber 53 having a wide angle lens at the end thereof. In the imaging spectral analyzer, a wavelength component of the plasma light which is emitted from a fluorine radical generated by the decomposition of the reactant gas and has a wavelength of 703.7 nm, and a wavelength component which is emitted from a CO radical produced from an $SiO_2$ film and has a wavelength of 519.8 nm, are measured by rotating the interference filter 52. According to the above analyzer, the distribution of a chemical species for etching the SiO$_2$ film can be monitored by measuring the distribution of light due to the fluorine radical, and the distribution of etching quantity in the surface of the wafer can be monitored by measuring the distribution of light due to the CO radical. The pressure, flow rate and composition of the plasma generating gas and the plasma exciting power are controlled so that the distribution of the chemical species and the distribution of the etching quantity are kept constant. Further, the constituent elements of the plasma generating apparatus and the construction thereof are adjusted so that the above condition is satisfied.

In the above, a plasma etching apparatus is shown as the plasma generating apparatus by way of example. The plasma generating apparatus includes a plasma CVD apparatus, a plasma ashing apparatus for removing a photoresist formed on a semiconductor wafer. Further, the above imaging spectral analyzer can be used for maintaining the light generating state of a plasma utilization apparatus such as an arc welding apparatus. Additionally, the imaging spectral analyzer can be used as a rainy weather monitoring apparatus for measuring a ratio of the intensity of infrared radiation to the intensity of visible light to obtain information on whether the sky becomes clear or cloudy.

As has been explained in the foregoing, according to the present invention, the intensity of radiation from a to-be-measured object placed in a plasma and the intensity of plasma light are measured, and the intensity of the above radiation is corrected by the intensity of the plasma light. Thus, the intensity of thermal radiation from the to-be-measured object can be determined without being affected by the plasma, and the temperature of the to-be-measured object can be determined correctly.

Further, the reflectivity of the surface of the to-be-measured object can be determined by using the plasma light. Accordingly, the temperature of a to-be-measured object whose reflectivity varies greatly with temperature can be determined accurately.

Additionally, according to the present invention, there is provided an aluminum sputtering apparatus for manufacturing semiconductor devices which apparatus makes it possible to detect the temperature distribution on a wafer exactly, and thus can greatly improve the manufacturing yield of the wafer.

We claim:

1. A temperature measuring apparatus utilizing radiation, comprising:
   measuring means for measuring an intensity of radiation from a to-be-measured object placed in a plasma and an intensity of a plasma light, in different directions at the same time;
   means for correcting a measured value of the intensity of the radiation by the measured value of the intensity of the plasma light to determine a correct intensity of thermal radiation of the to-be-measured object on the basis of the measured values being obtained by the measuring means; and
   means for calculating the temperature of the to-be-measured object from the correct intensity of thermal radiation thus obtained.

2. A temperature measuring apparatus utilizing radiation as claimed in claim 1, wherein the measuring means includes:
   a multi-surface mirror for receiving radiation from the to-be-measured object placed in the plasma and the plasma light, in different directions at the same time, to reflect the radiation and the plasma light in the same direction;
   a camera lens for receiving light reflected from the multi-surface mirror;
   a first relay lens for converting the output beam of the camera lens into parallel light rays;
   an interference filter for transmitting a specified wavelength component of the parallel light rays;
   a second relay lens for focusing a light beam having passed through the interference filter; and
   an imaging element for converting an image formed of the focused beam into a video signal.

3. A temperature measuring apparatus utilizing radiation, comprising:
   a multi-surface mirror for receiving radiation from a to-be-measured object placed in a plasma and plasma light, in different directions at the same time, to reflect the radiation and the plasma light in the same direction;
   a camera lens for receiving light reflected from the multi-surface mirror;
   a first relay lens for converting the output beam of the camera lens into parallel light rays;
   an interference filter for transmitting a specified wavelength component of the parallel light rays;
   a second relay lens for focusing a light beam having passed through the interference filter;
   an imaging element for converting an image formed of the focused beam into a video signal;
   correction means for calculating the intensity distribution of the radiation from the to-be-measured object and the intensity distribution of the plasma light, on the basis of the video signal, and for correcting the intensity of the radiation by the intensity of the plasma light from the result of calculation, to determine the correct intensity of thermal radiation of the to-be-measured object; and
   calculation means for calculating the temperature of the to-be-measured object from the intensity of thermal radiation thus obtained.

4. A temperature measuring apparatus utilizing radiation as claimed in claim 3, further comprising drive means for tilting the light receiving surface of the interference filter to enable the interference filter to transmit a plurality of wavelength components of the radiation from the to-be-measured object.

5. A temperature measuring apparatus utilizing radiation as claimed in claim 4, wherein in order to measure appropriate wavelength components of the radiation from the to-be-measured object, the light receiving surface of the interference filter is tilted on the basis of data from a data base.

6. A method of measuring the temperature of a to-be-measured object placed in a plasma by using a radiation thermometer, comprising the steps of:
   measuring the intensity of radiation from the to-be-measured object nd the intensity of plasma light, in different directions at the same time;
   correcting the measured value of intensity of the radiation by the measured value of intensity of the plasma light, to determine the intensity of thermal radiation of the to-be-measured object; and
   calculating the temperature of the to-be-measured object from the intensity of thermal radiation thus obtained.

7. A method of measuring the temperature as claimed in claim 6, wherein the step of measuring the intensity of radiation from the to-be-measured object and the intensity of plasma light, in different directions at the same time includes utilizing:

a multi-surface mirror for receiving radiation from the to-be-measured object placed in the plasma and the plasma light, in different directions at the same time, to reflect the radiation and the plasma light in the same direction;

a camera lens for receiving light reflected from the multi-surface mirror;

a first relay lens for converting the output beam of the camera lens into parallel light rays;

an interference filter for transmitting a specified wavelength component of the parallel light rays;

a second relay lens for focusing a light beam having passed through the interference filter; and an imaging element for converting an image formed of the focused beam into a video signal.

8. A method of measuring the temperature of a to-be-measured object placed in a plasma by using a radiation thermometer, comprising the steps of:

comparing light having merely passed through the plasma, with light which has passed through the plasma and is then reflected from the to-be-measured object, to calculate the reflectivity at the surface of the to-be-measured object; and correcting the temperature of the to-be-measured object measured by the radiation thermometer, by using the calculated reflectivity, to determine the true temperature of the to-be-measured object.

9. An imaging spectral analyzer provided with measuring means for measuring the intensity of radiation from a radiator placed in a plasma and means for determining the light intensity distribution on the radiator on the basis of the intensity of the radiation obtained by the measuring means, wherein the measuring means includes a first lens for receiving radiation from the radiator and plasma light, a second lens for converting the output beam of the first lens into parallel light rays, a third lens for focusing the parallel light rays, and an interference filter disposed rotatably between the second lens and the third lens.

10. A imaging spectral analyzer according to claim 9, further comprising a polarization filter disposed on the optical path of the analyzer so as to be able to turn on the center axis of the optical path, and drive means for rotating the polarization filter.

11. An imaging spectral analyzer as claimed in claim 9, wherein the radiator includes a multi-surface mirror and the first lens includes a camera lens for receiving light reflected from the multi-surface mirror.

12. An imaging spectral analzyer provided with a camera lens for receiving an image of a radiator, a first relay lens for converting the output beam of the camera lens into parallel light rays, an interference filter for transmitting a specified wavelength component of the parallel light rays, a second relay lens for focusing a light beam having passed through the interference filter, an imaging element for converting an image formed of the focused light beam into a video signal, and control means for converting the video signal into image information, all of the camera lens, the first relay lens, the interference filter, the second relay lens and the imaging element being disposed on an optical path; wherein the interference filter is made up of two filter plates which are perpendicular to each other and have different transmitted wavelengths, and the interference filter is rotated by driving means so that one of the filter plates is pependicular to the parallel light rays.

13. A spectral surface analyzer according to claim 12, further comprising a polarization filter disposed on the optical path of the analyzer so as to be able to turn on the center axis of the optical path, and drive means for rotating the polarization filter.

14. An apparatus comprising:

measuring means for measuring an intensity of radiation from a to-be-measured object placed in a plasma and an intensity of a plasma light, in at least two different directions at the same time;

means for correcting a measured value of the intensity of the radiation by the measured value of the intensity of the plasma light to determine a correct intensity of thermal radiation of the to-be-measured object on the basis of the measured values being obtained by the measuring means; and means for calculating the temperature of the to-be-measured object from the correct intensity of thermal radiation thus obtained.

15. An apparatus as claimed in claim 14, further comprising:

control means for controlling the temperature of the to-be-measured object measured by the temperature measuring apparatus; and sputtering means for sputtering a substance to form a film on the to-be-measured object, the temperature of the to-be-measured object being controlled by the control means so that the film formed on the to-be-measured object is homogeneous.

16. An apparatus as claimed in claim 15, wherein the means for measuring the intensity of radiation from a to-be-measured object placed in a plasma and the intensity of plasma light in different directions at the same time includes:

a multi-surface mirror for receiving the radiation and the plasma light and reflecting the radiation and the plasma light in the same direction;

a camera lens for receiving light reflected from the multi-surface mirror;

a first relay lens for converting the output beam of the camera lens into parallel light rays;

an interference filter for transmitting a specified wavelength component of the parallel light rays;

a second relay lens for focusing a light beam having passed through the interference filter; and an imaging element for converting an image formed of the focused beam into a video signal.

* * * * *